US011347796B2

(12) United States Patent
Peri et al.

(10) Patent No.: US 11,347,796 B2
(45) Date of Patent: May 31, 2022

(54) ELIMINATING MANY-TO-MANY JOINS BETWEEN DATABASE TABLES

(71) Applicant: SISENSE LTD., Ramat Gan (IL)

(72) Inventors: Omer Peri, Ra'anana (IL); Eldad Farkash, Tel-Aviv (IL)

(73) Assignee: Sisense Ltd., Ramat Gan (IL)

( * ) Notice: Subject to any disclaimer, the term of this patent is extended or adjusted under 35 U.S.C. 154(b) by 1016 days.

(21) Appl. No.: 15/234,732

(22) Filed: Aug. 11, 2016

(65) Prior Publication Data

US 2018/0046669 A1 Feb. 15, 2018

(51) Int. Cl.
*G06F 16/901* (2019.01)
*G06F 16/2453* (2019.01)

(52) U.S. Cl.
CPC .... *G06F 16/9024* (2019.01); *G06F 16/24544* (2019.01)

(58) Field of Classification Search
CPC ......... G06F 17/30592; G06F 17/30457; G06F 17/30489; G06F 17/30498; G06F 17/30448
See application file for complete search history.

(56) References Cited

U.S. PATENT DOCUMENTS

| 6,341,281 | B1 * | 1/2002 | MacNicol | G06F 17/30451 |
| | | | | 707/999.002 |
| 7,167,852 | B1 * | 1/2007 | Ahmed | G06F 17/30587 |
| | | | | 707/714 |
| 7,318,058 | B2 | 1/2008 | Styles | |
| 8,543,566 | B2 | 9/2013 | Weissman et al. | |
| 2004/0172400 | A1 * | 9/2004 | Zarom | G06F 16/90339 |
| | | | | 707/999.1 |
| 2007/0192283 | A1 * | 8/2007 | Larson | G06F 17/30442 |
| | | | | 707/999.002 |
| 2009/0070315 | A1 * | 3/2009 | Ahmed | G06F 17/30492 |
| | | | | 707/E17.008 |
| 2015/0278306 | A1 * | 10/2015 | Cheng | G06F 17/30469 |
| | | | | 707/714 |

FOREIGN PATENT DOCUMENTS

WO 2011/044111 A1 4/2011

* cited by examiner

*Primary Examiner* — Yuk Ting Choi
(74) *Attorney, Agent, or Firm* — M&B IP Analysts, LLC

(57) ABSTRACT

A method, computer system and computer program product, the method comprising: upon receiving a database query comprising at least a first and a second join operations: storing the database query in the memory; identifying by the processor within the database query the first join operation, wherein the first join operation is a many-to-many join operation or a one-to-many join operation between a first table and a second table, in which fields of the second table are used only for filtering rows from the first table or for joining with another table; and converting by the processor the first join operation to an enhanced operation which eliminates returning at least two matches for at least one row from the first table when the database query is executed.

16 Claims, 5 Drawing Sheets

ELIMINATING MANY-TO-MANY JOINS BETWEEN DATABASE TABLES

TECHNICAL FIELD

The presently disclosed subject matter relates to the execution of database queries.

BACKGROUND

Databases are used in almost any computerized application, including but not limited to healthcare, banking, commerce, research, manufacturing, insurance, or the like.

Some database operations include updating a database, whether said updating relates to the database schema or to its contents. Other operations may relate to retrieving content from the database, for example in the form of records.

When retrieving data, care should be taken to ensure that returned records comprise the required data, without any or at least as little as possible redundant information. The redundant information can comprise for example unnecessary pieces of information, or multiple instances of the same data.

GENERAL DESCRIPTION

A first aspect of the disclosed subject matter relates to a computer-implemented method of enhancing database query execution, using one or more processors operatively connected to a memory, the method comprising: upon receiving a database query comprising at least a first and a second join operations: storing the database query in the memory; identifying by the processor within the database query the first join operation, wherein the first join operation is a many-to-many join operation or a one-to-many join operation between a first table and a second table, in which fields of the second table are used only for filtering rows from the first table or for joining with another table; and converting by the processor the first join operation to an enhanced operation which eliminates returning two or more matches for one or more rows from the first table when the database query is executed.

In addition to the above features, the method according to this aspect of the presently disclosed subject matter can optionally comprise one or more of features (i) to (x) listed below, in any technically possible combination or permutation:

i). converting the second join operation to an enhanced operation, subject to the second join operation being between a third table and a fourth table, in which the fourth table fields are used only for filtering rows from the third table or for joining with other tables.

ii). wherein the first join operation is optionally converted during execution of the database query.

iii). wherein the enhanced operation is optionally a semi-join operation.

iv). wherein identifying the first join operation optionally comprises: building a graph data structure from the query, the graph comprising: a respective node for each table in the query, and an edge connecting two nodes where the database query comprises a join operation between the two tables represented by the two nodes, the edge representing the join operation; and traversing the graph for identifying edges representing at least the first join operation.

v). wherein building the graph data structure optionally comprises: generating the graph data structure from the query; indicating each node connected to an edge in the graph as not-visited; indicating each node connected to an edge in the graph, which node represents a table in which no field is used for display, computation, or aggregation, as an invisible node; and indicating each node connected to an edge in the graph, which node represents a table in which one or more fields are used for filtering, as a filtering node.

vi). wherein traversing the graph for identifying edges representing at least the first join operation comprises: while the graph contains invisible and not-visited nodes which are also a filtering node, repeating: selecting a first node with minimal number of edges; marking the first node as visited; and marking each edge connected to the first node as join-to-be-enhanced; and while the graph contains invisible and non-visited second nodes having one edge associated with a non-enhanced join operation, and at least one other edge marked as join-to-be-enhanced, repeating: marking second nodes as a filtering node; and repeating the step above performed while the graph contains invisible and not-visited nodes which are also a filtering node.

vii). wherein converting the first join operation to the enhanced operation is optionally subject to a condition selected from the group comprising: a user indicating that the first join should be converted; the user indicating that any of a group of join operations that includes the first join operation may be converted; the user indicating that any join operation may be converted; the first join being a many-to-many join operation; and size of the first join operation exceeding a predetermined number of records.

viii). wherein the database is optionally a colomnary database or a relational database.

ix). wherein the query is optionally an SQL query.

x). submitting the query for execution.

According to another aspect of the disclosed subject matter there is provided a computerized system for enhancing database query execution, the system comprising a processor configured to: upon receiving a database query comprising at least a first and a second join operations: storing the database query in the memory; identifying by the processor within the database query the first join operation, wherein the first join operation is a many-to-many join operation or a one-to-many join operation between a first table and a second table, in which fields of the second table are used only for filtering rows from the first table or for joining with another table; and converting by the processor the first join operation to an enhanced operation which eliminates returning two or more matches for one or more rows from the first table when the database query is executed.

According to another aspect of the presently disclosed subject matter there is provided a computer readable storage medium retaining program instructions, which program instructions when read by a processor, cause the processor to perform a method comprising: upon receiving a database query comprising at least a first and a second join operations: storing the database query in the memory; identifying by the processor within the database query the first join operation, wherein the first join operation is a many-to-many join operation or a one-to-many join operation between a first table and a second table, in which fields of the second table are used only for filtering rows from the first table or for joining with another table; and converting by the processor the first join operation to an enhanced operation which eliminates returning two or more matches for one or more rows from the first table when the database query is executed.

According to another aspect of the presently disclosed subject matter there is provided a database management system for enhancing database query execution, the database management system configured for managing a database, the database management system operatively connected to a storage device and configured to: upon receiving a database query comprising at least a first and a second join operations: storing the database query in the memory; identifying by the processor within the database query the first join operation, wherein the first join operation is a many-to-many join operation or a one-to-many join operation between a first table and a second table, in which fields of the second table are used only for filtering rows from the first table or for joining with another table; and converting by the processor the first join operation to an enhanced operation which eliminates returning two or more matches for one or more rows from the first table when the database query is executed.

The computerized system, the computer program product and the database management system disclosed in accordance with the presently disclosed subject matter can optionally comprise one or more of features (i) to (x) listed above, mutatis mutandis, in any desired combination or permutation.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide examples or aspects of the disclosure and do not limit the scope of the disclosure. In the drawings.

DETAILED DESCRIPTION

Figure 1A:
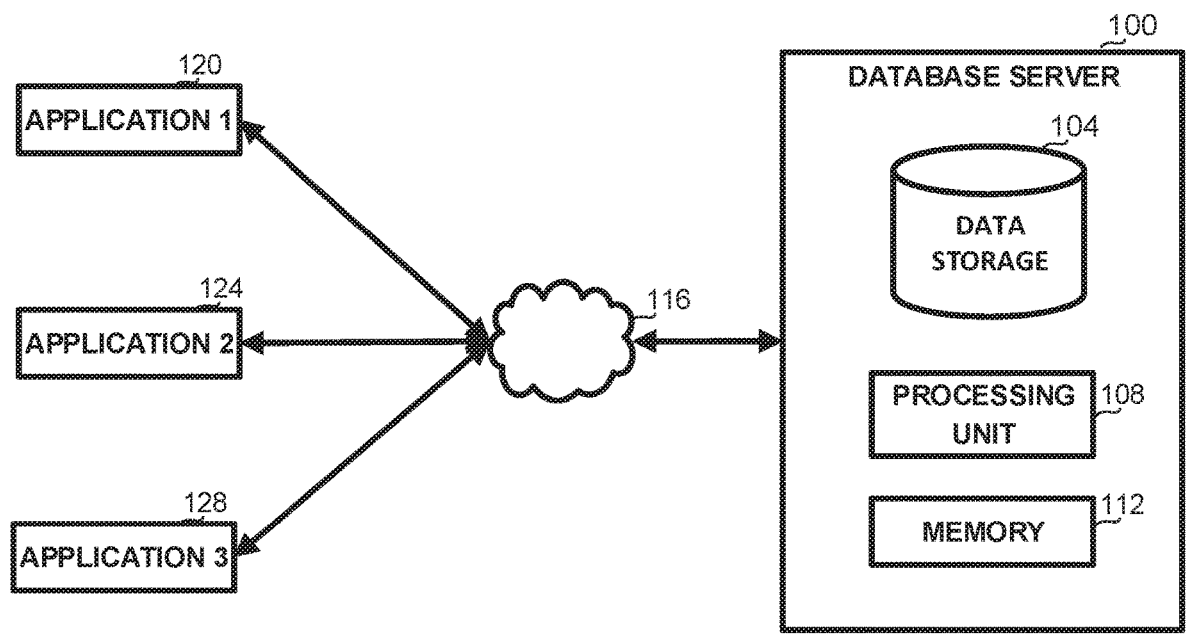
FIG. 1A is a schematic functional block diagram of an environment in which the disclosed subject matter is used.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "representing", "comparing", "generating", "assessing", "matching", "updating" or the like, refer to the action(s) and/or process(es) of a computer that manipulate and/or transform data into other data, said data represented as physical, such as electronic, quantities and/or said data representing the physical objects.

The terms "computer" or "computerized system" should be expansively construed to cover any kind of computerized device, including any hardware-based electronic device with data processing capabilities comprising one or more computer processors and further comprising or otherwise connected to computer memory.

The operations in accordance with the teachings herein can be performed by a computer specially constructed for the desired purposes or by a general-purpose computer specially configured for the desired purpose by a computer program stored in a non-transitory computer-readable storage medium.

The terms "non-transitory memory" and "non-transitory storage medium" are used herein should be expansively construed to cover any include any volatile or non-volatile computer memory suitable to the presently disclosed subject matter.

One technical problem handled by the discloses subject matter relates to database queries that comprise operations, and in particular "join" operations that perform multiplication of matches between of two or more tables. The general structure of a join operation between tables A and B is as follows:

Select <A.selected_fields, B.selected_fields>
from A join B
on A.id_fieldA=B.id_fieldB
where <criteria connecting A fields and B fileds>

When a join operation is performed between two tables having non-unique values in the join columns (A.id_fieldA and B.id_fieldB in the example above), then a many-to-many ("M2M") join can be performed. An M2M join between tables might create a large multiplication result between the tables, including some or all of the rows in either table. If any of the tables, for example table B, has multiple records with the same id_fieldB value, then multiple rows will be returned for every row in table A that has a match n table B. Thus, the result of such multiplication can include significant amounts of information that may be redundant. Processing a large number of redundant records requires significant time, and consumes excessive memory and processing resources.

In some cases, B.selected_fields may be empty, which can suggest that table B was intended to be used in this query only for filtering rows from table A, with no further use of fields from table B for any further computations, display or any other purposes. It will be appreciated that using fields of table B for join operations with other tables is not considered usage in this context. Since in some applications or queries join multiplication in addition to usage for filtering may be on purpose, in some embodiments user confirmation may be required for handling these cases, as detailed below.

Such join operation may cause the returning of multiple identical rows. For example, a database can comprise the following tables:

TABLE 1

| OrderItems | |
|---|---|
| ItemID | OrderID |
| 1 | 10 |
| 2 | 10 |
| 1 | 20 |
| 3 | 20 |
| 5 | 40 |
| 2 | 40 | and

TABLE 2

| OrderStatus | | |
|---|---|---|
| OrderID | StatusDate | StatusID |
| 10 | 1/1/2016 | 1 |
| 20 | 2/2/2016 | 2 |
| 20 | 1/2/2016 | 1 |
| 40 | 3/5/2016 | 3 |
| 20 | 1/1/2016 | 1 |
| 40 | 7/3/2016 | 1 |

Performing the following SQL command:
Select OrderItems.ItemID
from OrderItems join OrderStatus
on OrderItems.OrderID=OrderStatus.OrderID
where OrderStatus.statusID=1
will return the following records:

TABLE 3

| ItemID |
|---|
| 1 |
| 1 |
| 3 |
| 5 |
| 1 |
| 3 |
| 2 |

Thus, multiple identical rows are returned, and such rows may indeed be redundant if the OrderStatus table, which is joined to the OrderItems table, was intended only for filtering rows from the OrderItems table, and no information from the OrderStatus table is used for display, computations, aggregations, or the like. In a real world case, for example in a large database, such results may comprise hundreds of millions or more records. In cases wherein the join operation is for filtering only, this does not only waste computer resources, but may also create confusion and make the user's work less effective. In some cases, the result set may not be returned at all within a practical period of time, due for example to memory limitations which may inhibit completing the task within the reasonable time period. The problem may get worse when a query involving two or more join operations is executed or attempts to execute.

It will be appreciated that a query comprising a join operation for filtering only, may be entered by a user for some reasons, for example: the user may be unaware that non-unique values are involved in the join; the user may trust that redundant values are eliminated by operations like "group by" or "distinct", not knowing that the filters are applied on the result of the join; the user may not notice that an M2M may occur due to the join, or the like. Sometimes a user may build an SQL query incrementally, by examining SQL results and refining, fixing or completely changing the query, in which case the behavior may change. In some cases, the query may not return at all, or may take a long time due to the M2M resources requirements, thus degrading or preventing the iteration process of building the SQL.

In some situations, a query comprising a join operation for filtering only, whether the query is the final one or an intermediate one, may also be constructed automatically by a Graphic User Interface (GUI) in response to user interactions. In further situations, while preparing an SQL query, whether manually or via a GUI, a user or Database Admin may work on a sample database, a small portion of the database or a schema of the database, which makes any M2M join insignificantly from the performance point of view. Once the SQL is ready, when applied to a real-world database, the M2M join may become unusable or very slow due to resource consumption when working on a large amount of data. It will also be appreciated that a query comprising such a join operation for filtering only, may not only be entered by an unaware user directly typing such command, but may also be automatically generated by a graphic user interface, in response to user actions, or in any other manner.

It will also be appreciated that although multiple identical rows may be eliminated using operations such as "group by" or "distinct", wherein some of these operations may be applied to the result set after processing has been done and the result set of the join operation has been created, and therefore will not eliminate the significant time, memory and processing resources required for initially generating the set. On the contrary, in some cases such as when the join fields comprise unique identifiers and thus no M2M join occurs, although the results will not change, the performance may degrade, due to the additional operations.

Alternatively, the problem may be eliminated by remodeling the database to prevent M2M relations. However, this is not always feasible, for example, the database may be part of a legacy system, accessed by other applications, or there may not be enough resources for changing the database.

Yet another alternative comprises rewriting SQL commands sent to the database, such that the commands will not contain such joins. However, this is also not always possible, for example, when the queries are generated online using a graphic user interface or another mechanism. In other situations, the queries are pre-written and cannot be changed.

It will be appreciated that these problem may also occur when a one-to-many (O2M) join operation is applied.

Some embodiments of the disclosed subject matter relate to a method and corresponding system, configured to receive a query, identify within the query situations in which a table is used in an O2M or an M2M join operation only for filtering, and eliminate these situations. Elimination may be performed by creating an enhanced query, for example by replacing the join operation by an operation such as semi-join, in which the unique join attributes of one table are collected before being crossed with the other table.

The identification and replacement can be performed in runtime when the query is executed. Alternatively, a query that may be repeated, for example a query within a ready script, the analysis and replacement may be performed once, the enhanced query or instruction set may be stored, and the query as enhanced may be executed when required.

In some embodiments, identification is performed by representing the query as a hierarchical manner, such as a graph data structure in which each node represents a table, and each edge between two nodes represents a join operation between the two tables represented by the two nodes. The graph may then be traversed, as described below. During traversing, all edges representing join operations in which one table is used merely for filtering are marked. The join operations associated with the marked edges may then be replaced by semijoin operations, or other operations that eliminate the M2M join.

It will be appreciated that the subject matter disclosed herein can be applied to columnar database in which the data is stored in columns or to relational database in which the data is stored in tables or rows, or to other types of database.

It will also be appreciated that identifying and replacing join operations used for filtering only may be particularly useful in SQL queries comprising a succession of multiple joins, thus joining three or more tables.

One advantage of the disclosed subject matter relates to eliminating costly and ineffective O2M and M2M join operations in which a table in a join is used only for filtering. Eliminating such join operation is fast and efficient, and significantly reduces time and computer resources consumption, whereas join operations may otherwise return hard to use results or may even not return results at all due to insufficient resources.

Another advantage of the disclosed subject matter is that the method does not add significant overhead and does not harm the results or the performance in cases where using the method is not necessary.

Yet another advantage of the disclosed subject matter is that the method and apparatus can be applied to existing queries, whether received from a user or generated online by a computer implemented graphic user interface. The method and computerized system may also be used with any database as is and do not necessitate any change in the database schema or content.

Referring now to FIG. 1A, showing a schematic functional block diagram of an environment in which the disclosed subject matter is used.

The environment comprises database server 100, which may be implemented as a computing platform, comprising a data storage device 104 for storing data, whether as a columnar or a relational database. Storage device 104 can comprise a physical storage space with one or more storage devices having direct or indirect communication therebetween. The storage devices may be any one of Hard Disk devices (HDD) or Solid State Drives (SSD, comprising for example, a plurality of NAND elements) or any other appropriate data storage device.

Database server 100 may further comprise processing unit 108, which can comprise one or more processing devices such as but not limited to: a Central Processing Unit (CPU), a microprocessor, an electronic circuit, an Integrated Circuit (IC), a Central Processor (CP), or the like.

Processing unit 108 may be utilized to perform computations required by the system or any of its subcomponents. Processing unit 108 can comprise one or more processors in direct or indirect communication. Processing unit 108 can be configured to execute operations in accordance with computer-readable instructions implemented on a non-transitory computer usable medium.

Database server 100 may further comprise persistent or volatile memory 112 for retaining program code operative to cause processing unit 108 to perform acts associated with any of the detailed methods.

Database server 100 can communicate with one or more applications such as application 1 (120), application 2 (124) or application 3 (128). Any of the applications can comprise user interface for entering textual commands, a communication link to receiving textual commands, an application having a graphic user interface, or the like. Any such application may relate to research, management, intelligence, or the like, in any subject such as science, health, commerce, retail, or the like. The applications are executed on one or more computerized devices which may include, or be in communication with Database server 100.

Database server 100 or its components can communicate therebetween and with any of the applications via communication channel 116, such as the internet, Intranet, Local Area Network (LAN), wide area network (WAN), or the like.

Processing unit 108 can be adapted to receive a query or a data structure created based on a query from any of the applications, to process the data structure and enhance join operations used for filtering only, to execute the enhance query and return the results to the application.

Figure 1B:
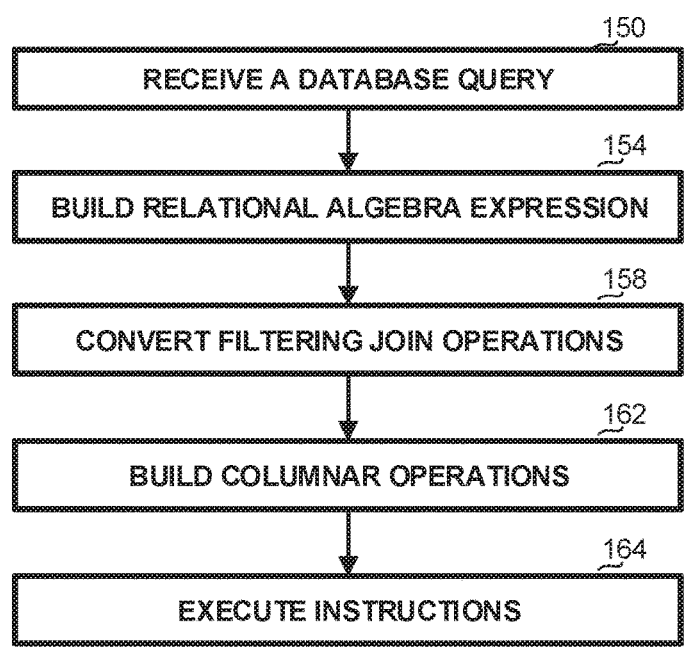
FIG. 1B is a flowchart of operations in a method of processing a query, in accordance with an example of the presently disclosed subject matter.

Referring now to FIG. 1B, showing a flowchart of operations in a method of processing a query, in accordance with some embodiments of the disclosure. The operations described with reference to FIG. 1b can be executed for example by database server 100 described above and in particular by DBMS 415 detailed below.

On stage 150, a query may be received. The query can be received for example, from a user, from an application in which the query is generated in response to interactions with a user interface, or from any other source. The query can be received for example as a character string, as a data structure, or the like.

On stage 154, referred to as relations stage, a relational algebra expression may be built upon the query. For example, the expression may be a relation tree, in which each node represents an operation, and the edges point at relations which are used as operands for the operation.

On stage 158, the relational algebra expression may be analyzed to identify join operations in which a table is used for filtering only, and convert them to enhanced operations, such as semijoin, thus eliminating the join operation. Stage 158 is further detailed in association with FIGS. 2A-2D below.

On stage 162, referred to as columnar operation stage, the enhanced query may be transformed to field-based query comprising columnar operations.

On stage 166, referred to as instruction stage, specific instructions may be executed by the database.

Thus, although the query analysis and conversion may be performed between the relation stage and the columnar operation stage, the actual influence is during the instruction stage in which the command is performed by the database.

It will be appreciated that the flowchart of FIG. 1B is not intended to limit the scope of the current disclosure, and other methodologies may be used in which join operations that use a table for filtering only are identified and converted.

Reference is now made to FIGS. 2A-2D, detailing stage 158 of FIG. 1B. The operations detailed in FIGS. 2A-2D can be performed for example by processing unit 108 of database server 100 and in particular by DBMS 415 detailed below.

Figure 2A:
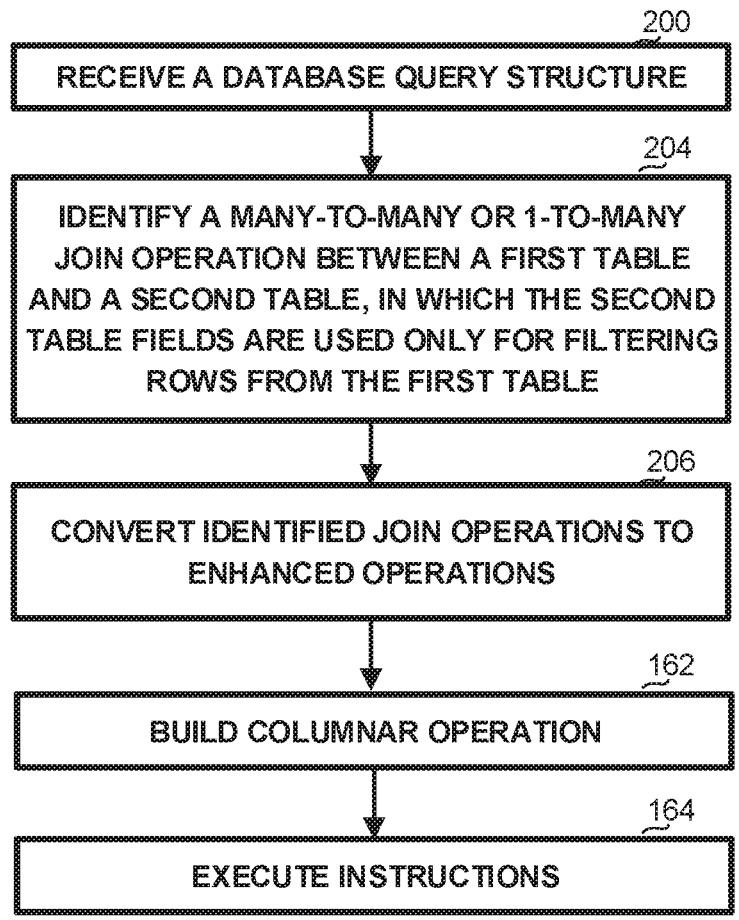
FIG. 2A is a flowchart of operations carried out for identifying and converting join operations, in accordance with an example of the presently disclosed subject matter.

Referring now to FIG. 2A, showing a flowchart of operations in a method for identifying and converting join operations.

On stage 150, a database query, or a representation thereof, such as the query itself or a relational algebra expression may be received.

On stage 204, an M2M or an O2M join operation between two tables in which the fields of one table are used only for filtering rows from the other table, may be identified within the query representation. Stage 204 is further detailed in association with FIG. 2B below.

On stage 206, the identified join operations may be converted to enhanced operations, which do not cause the join. Stage 206 is further detailed in association with FIG. 2C below.

Following conversion stage 206, execution may continue on columnar operation building stage 162 and instruction execution stage 164 detailed above.

Figure 2B:
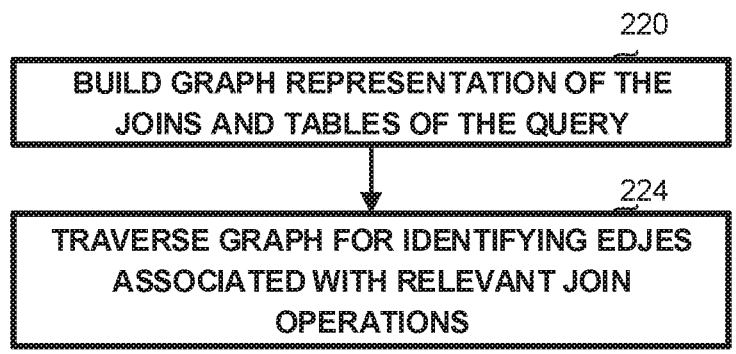
FIG. 2B is a flowchart of operations carried out for identifying join operations in which one table is used only for filtering, in accordance with an example of the presently disclosed subject matter.

Referring now to FIG. 2B, detailing identification operations 204 of FIG. 2A, and showing a flowchart of operations for a method of identifying join operations in which one table fields are used only for filtering.

On stage 220, a graph representation of the joins and tables in the query may be built, as further detailed in association with FIG. 2C below. The graph may be built, for example in accordance with the steps of FIG. 2C by graph building component 428 detailed below.

On stage 224 the graph may be traversed to identify edges within the graph, which are associated with join operations between two tables, in which one table is used only for filtering rows of the other table. The graph may be traversed, for example in accordance with the steps of FIG. 2D by graph traversing component 432 detailed below.

Figure 2C:
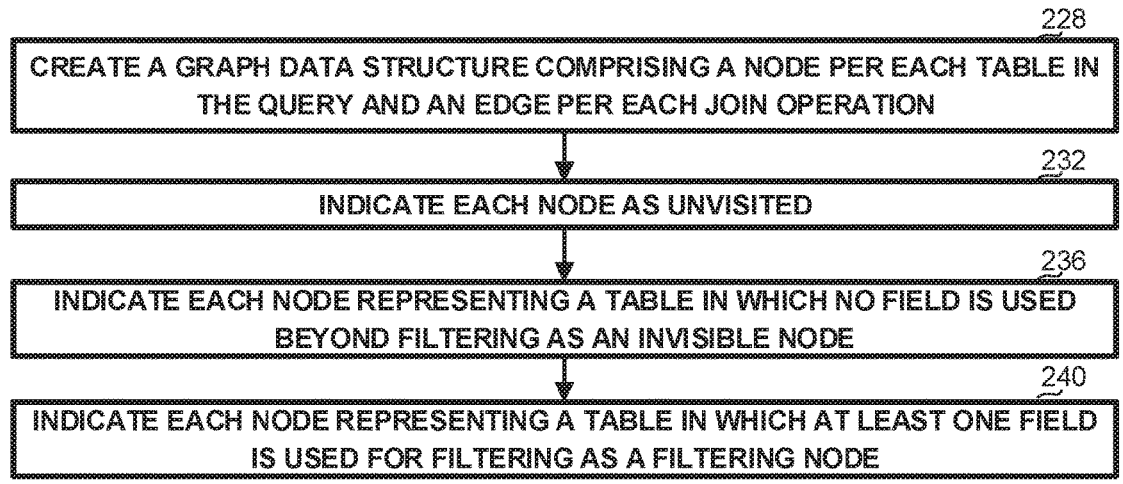
FIG. 2C is a flowchart of operations in a method of graph building, in accordance with an example of the presently disclosed subject matter.
Figure 3:
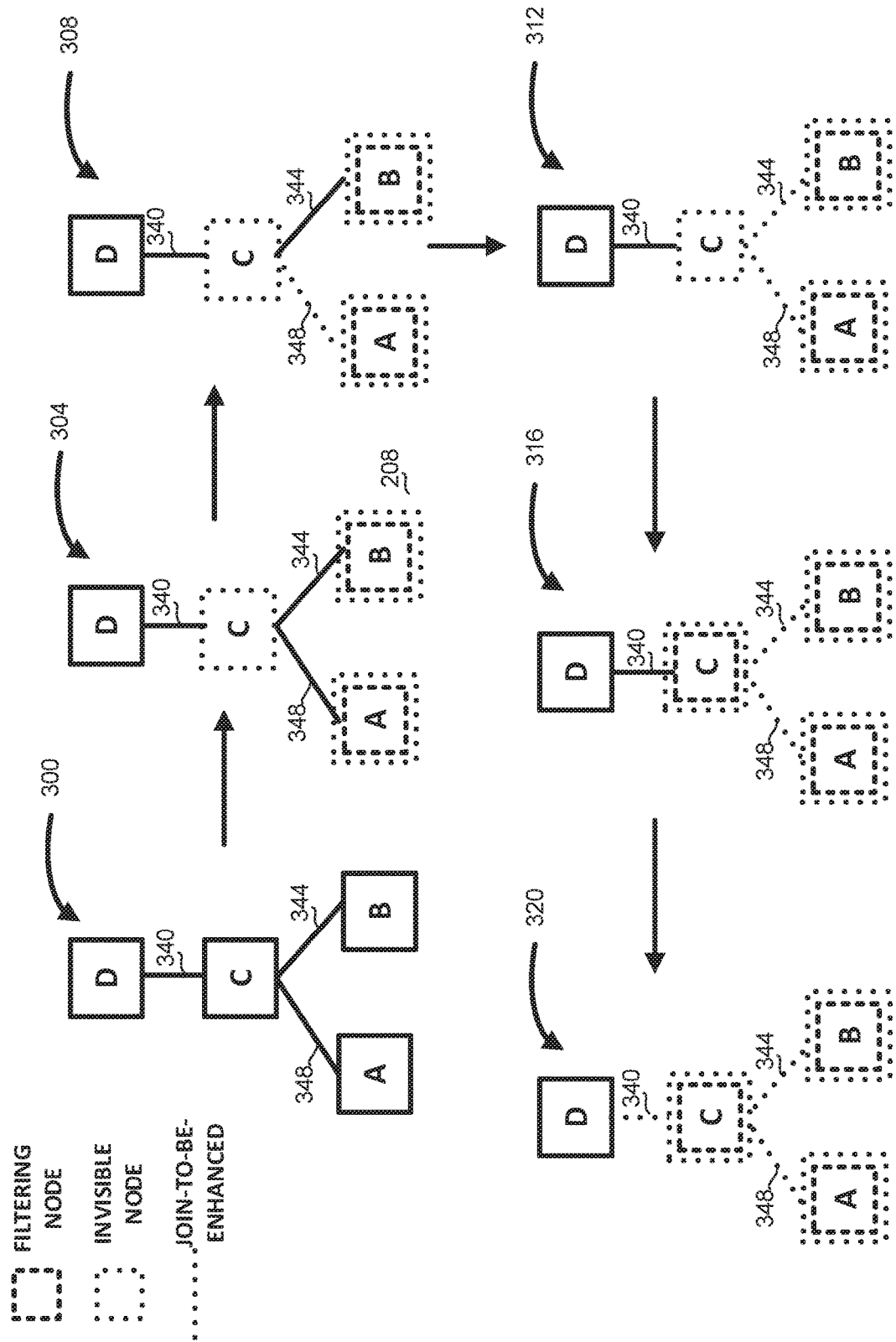
FIG. 3 is a graph series demonstrating the method of join operations identification and conversion in accordance with an example of the presently disclosed subject matter.

Referring now to FIG. 3, showing an example to the method of join operations identification and conversion, and to FIG. 2C, showing a flowchart detailing graph building stage 220 of FIG. 2B.

On stage 228, a graph data structure is constructed, comprising nodes and edges. Each node represents one table participating in the query, and an edge is formed between two nodes if there is a join operation between the two tables represented by the two nodes.

It will be appreciated that nodes that do not have any such edge in the graph can be disregarded.

It will also be appreciated that an edge may be created for any inner join.

Exemplary graph 300 illustrates stage 228 for the following query:
SELECT D.d
  FROM D
  JOIN C on D.c=C.c
  JOIN B on B.b=C.b
  JOIN A on A.a=C.a
  WHERE A.f1=1 AND B.f2=2

Each node may be indicated as visited or unvisited, wherein the default state is unvisited. Therefore, on stage 232 each node may be initially indicated as unvisited. The unconnected nodes, i.e., nodes that do not participate in a join operation may be skipped or indicated as well. Thus, all nodes of graph 300 are indicated as unvisited (not marked in FIG. 3).

On stage 236, each node representing a table in which no field is used beyond filtering or joining with other tables, may be indicated as invisible. Thus, if no field in a table is referred to, for example, selected for display or for any computation, aggregation, or the like, then the node is marked as invisible.

The fields of tables A and B are used by the SQL query only for filtering and joining, while the fields of table C are used only in join operations. Thus, nodes A, B, and C in graph 304 are indicated as invisible.

On stage 240, each node representing a table in which at least one field is used for filtering, i.e., it appears in the list of "where", may be indicated as a filtering node.

Thus, nodes A and B in graph 304 are marked as filtering, which does not contradict their mark as invisible.

Thus, each node may have three attributes: whether it has been visited, whether it is visible, and whether it is a filtering node.

Figure 2D:
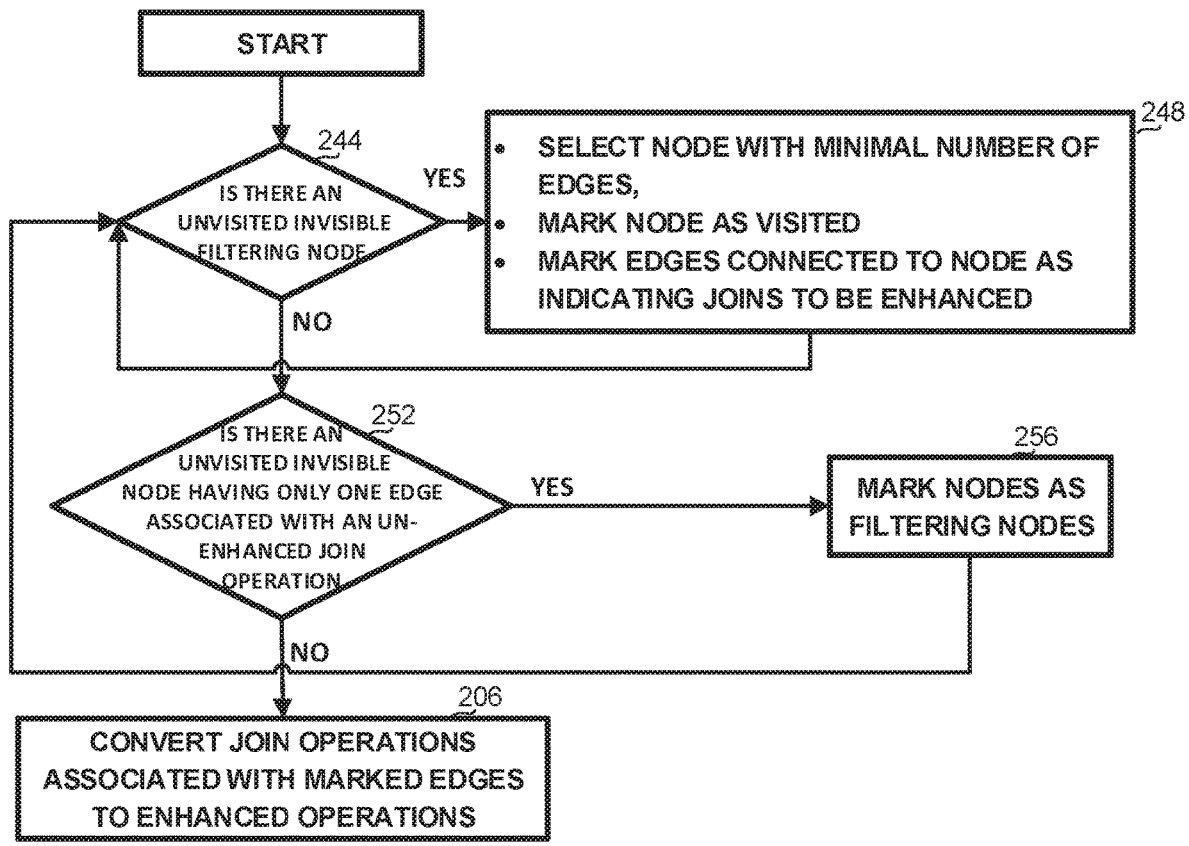
FIG. 2D is a flowchart of operations in a method of graph traversing, in accordance with an example of the presently disclosed subject matter.

Still referring to FIG. 3 and referring also to FIG. 2D, detailing graph traversing stage 224 of FIG. 2B.

On stage 244, it is determined whether an unvisited invisible filtering node exists in the graph. In the example of FIG. 3, tables A and B comply with this condition.

On stage 248, the node from the nodes identified on stage 244 and having a minimal number of edges that have not been marked as join-to-be-enhanced is selected, which may be either node A or B, for example node A. Node A is therefore marked as visited. In addition, and as shown in graph 308, the edge connected to node A is marked as a join-to-be-enhanced, as indicated by edge 348.

Stages 244 and 248 are then repeated for node B, and as shown in graph 312, the edge connected to node B is marked as a join-to-be-enhanced, as indicated by edge 344.

On stage 252 it is determined whether an unvisited invisible node exists, which has only one edge 340 associated with a non-enhanced join operation. Node C of graph 312 complies with this test.

On stage 256, all the nodes identified on stage 252 are marked as filtering nodes, if, excluding the single un-enhanced join edge, the nodes are connected only by joins-to-be-enhanced edges to filtering nodes. Thus, as shown in graph 316, node C is marked as filtering as it is connected to filtering nodes A and B, and has one non-enhanced join with table D.

Execution then returns to stage 244, in which node C is now identified as an unvisited invisible filtering node, and is thus selected and marked as visited as shown in graph 316. Edge 340 connecting node C to node D is then marked as a join-to-be-enhanced, as shown in graph 320.

At this stage there are no more unvisited invisible filtering nodes or unvisited invisible nodes having an edge associated with a join operation. Therefore execution continues at stage 206, in which the join operations associated with the marked edges, i.e., edges 340, 344 and 348 are marked as joins-to-be-enhanced, to avoid the O2M or M2M operations, such as semijoin. Execution may then continue as described in association with FIG. 2A above.

The methods disclosed above, and in particular the methods of FIGS. 2C and 2D detect and handle cases in which a succession of join operations and tables are comprised in an SQL query for the purpose of filtering only, i.e., a filtered table is connected to one or more filtering tables by one or more tables or joins. The join operations in the execution path are converted into operations such as semijoin, thus eliminating the many-to-many potential. The semijoin or similar operations eliminate the many-to-many potential since it returns a subset of rows from the filtered table in the join that has a match in the filtering table, regardless of how many matches there are.

It will be appreciated that even joins in which one or more of the tables is generated ad-hoc and are not part of the scheme can be analyzed and converted as required.

It will be appreciated that in some cases it may not be required to convert a join operation, even if such join operation involves a table used for filtering only.

For example, a user may indicate, using a textual flag or a user interface control, that no such conversion should take place. In other embodiments, a user may provide such indication for a specific join operation, a specific group of join operations, a specific type of join operations, join operations that involve one or more predetermined tables, or the like.

In further embodiments, such join operations may be converted if, for example, any of the tables comprises more than a predetermined number of values, or if the estimated size of the joined table exceeds a threshold.

In further embodiments, the join operations can be converted subject to the join operation being an M2M join and not an O2M join.

Figure 4:
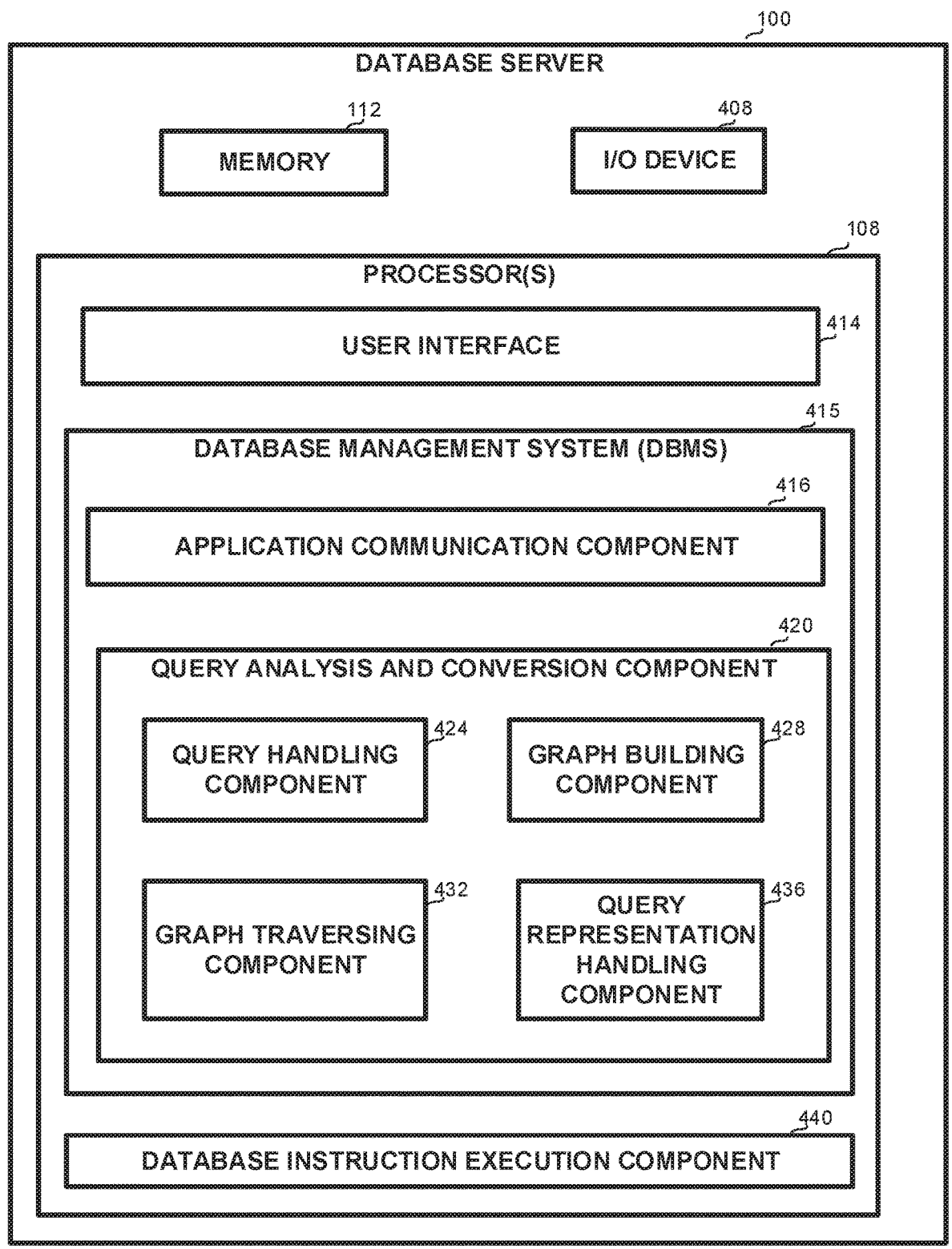
FIG. 4 is a functional block diagram of a computerized system for handling join operations in which one table is used only for filtering, in accordance with an example of the presently disclosed subject matter.

Referring now to FIG. 4, showing a functional block diagram of a computerized-system according to the presently disclosed subject matter. The disclosed system is capable of handling join operations in which one table is used only for filtering. FIG. 4 is a detailed example of database server 100 shown in FIG. 1.

Thus, database server 100 can comprise one or more memory devices 112 and processing unit 108. Database server 100 can further comprise I/O device 408, for enabling user interaction with the system including for example, inputting data such as, commands, filters, indications, or the like, or for receiving output from the database. I/O device 408 can comprise one or more of the following: a pointing device such as a mouse or touch screen, a keyboard, a display device, a microphone a speaker, or the like.

The components may execute entirely on the database server, partly on the database server, as a stand-alone software package, partly on the database server and partly on a remote computer or entirely on a remote computer or server. In the later scenario, the remote computer may be connected to the database server through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may provide the functionality of the present invention. Such components are understood as being comprised by processing unit 108.

Processing unit 108 can comprise user interface module 414 which generates user interface on a display device, for displaying data and options to a user, such as dashboard-like representation of the database or an application based thereon, a table representation of data, or the like. The user may also provide data to the server using user interface 414. User interface 414 may provide and receive data using any of/O devices 408.

Processing unit 108 can comprise database management system (DBMS) 415 for configuring and managing a database, including but not limited to providing Application Program Interface (API) for one or more user programs, receiving SQL from a user or a user program, and processing and executing the query. DBMS 415 may thus be operative in configuring the database, and in identifying and enhancing join operations used for filtering only as detailed above with reference to FIGS. 1B, 2A-2D, and 3.

DBMS 415 may be operatively connected to memory 112 and configured to implement a database for storing data. DBMS 415 may be configured in general to enable control and management of the database and to allow execution of various database related operations such as definition, creation, querying, updating, and database administration.

It will be appreciated that the components detailed below may be implemented as part of DBMS 415 but may also be implemented separately.

According to some examples of the presently disclosed subject matter, DBMS 415 can comprise one or more application communication component 416, for communicating with one or more applications that use database services. The applications may be executed on the same device or on any other device, and communication may take any form or protocol and be transmitted over any communication channel.

According to some examples of the presently disclosed subject matter, DBMS 415 can comprise query analysis and conversion component 420, for analyzing and converting queries provided by any of the applications, or received from another source.

Query analysis and conversion component 420 can comprise query handling component 424, which may be implemented as required, for example using methods known in the art, for example comprising a table stage and columnar operation, a table stage and a columnar operations stage, or the like. Query handling component 424 can perform columnar operation building step 162.

Analysis and conversion component 420 can then transmit the query to database instructions execution component 440.

Query analysis and conversion component 420 can comprise graph building component 428 for building a graph as described in association with FIG. 2C above, and graph traversing component 432 for traversing the graph as described in association with FIG. 2D above.

Analysis and conversion component 420 can comprise query representation handling component 436 for receiving a representation of the query, as generated, for example, by query handling component, and generating an enhanced query in accordance with the converted join commands. Query representation handling component 436 can perform join operations conversion 206.

Database instructions execution component 440 can be operative in executing the explicit instructions on the database and receiving responses.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It will also be noted that each block of the block diagrams and/or flowchart illustration may be performed by a multiplicity of interconnected components, or two or more blocks may be performed as a single block or step.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention claimed is:

1. A computer-implemented method of enhancing database query execution, using at least one processor operatively connected to a memory, the method comprising:
   upon receiving a database query comprising at least a first join operation and a second join operation:
   storing the database query in the memory;
   identifying by the processor within the database query the first join operation, wherein the first join operation is a many-to-many join operation or a one-to-many join operation between a first table and a second table, wherein fields of the second table are used only for filtering rows from the first table or for joining with another table; and
   converting by the processor the first join operation to an enhanced operation which eliminates returning at least two matches for at least one row from the first table when the database query is executed, wherein the enhanced operation does not cause a join.

2. The method of claim 1, further comprising converting the second join operation to an enhanced operation, subject to the second join operation being between a third table and a fourth table, in which the fourth table fields are used only for filtering rows from the third table or for joining with other tables.

3. The method of claim 1, wherein the first join operation is converted during execution of the database query.

4. The method of claim 1, wherein the enhanced operation is a semijoin operation.

5. The method of claim 1, wherein identifying the first join operation comprises:
   building a graph data structure from the query, the graph comprising:
   a respective node for each table in the query, and an edge connecting two nodes where the database query comprises a join operation between the two tables represented by the two nodes, the edge representing the join operation; and
   traversing the graph for identifying edges representing at least the first join operation.

6. The method of claim 5, wherein building the graph data structure comprises:
   generating the graph data structure from the query;
   indicating each node connected to an edge in the graph as not-visited:
   indicating each node connected to an edge in the graph, which node represents a table in which no field is used for display, computation, or aggregation, as an invisible node; and
   indicating each node connected to an edge in the graph, which node represents a table in which at least one field is used for filtering, as a filtering node.

7. The method of claim 6 wherein traversing the graph for identifying edges representing at least the first join operation comprises:
   a. while the graph contains invisible and not-visited nodes which are also a filtering node, repeating:
   selecting a first node with minimal number of edges;
   marking the first node as visited; and
   marking each edge connected to the first node as join-to-be-enhanced; and b. while the graph contains invisible and non-visited second nodes having one edge associated with a non-enhanced join operation, and at least one other edge marked as join-to-be-enhanced, repeating:
   marking second nodes as a filtering node; and
   repeating step (a).

8. The method of claim 1, wherein converting the first join operation to the enhanced operation is subject to at least one condition selected from the group comprising: a user indicating that the first join should be converted; the user indicating that any of a group of join operations that includes the first join operation may be converted; the user indicating that any join operation may be converted; the first join being a many-to-many join operation; and size of the first join operation exceeding a predetermined number of records.

9. The method of claim 1, wherein the database is a columnary database or a relational database.

10. The method of claim 1, wherein the query is an SQL query.

11. The method of claim 1, further comprising submitting the query for execution.

12. A computerized system for enhancing database query execution, the system comprising a processor configured to:
   upon receiving a database query comprising at least a first join operation and a second join operation:
   store the database query in the memory:
   identify within the database query the first join operation, wherein the first join operation is a many-to-many join operation or a one-to-many join operation between a first table and a second table, wherein fields of the second table are used only for filtering rows from the first table or for joining with another table; and
   convert the first join operation to an enhanced operation which eliminates returning at least two matches for at least one row from the first table when the database query is executed, wherein the enhanced operation does not cause a join.

13. The computerized system of claim 12, wherein the enhanced operation is a semijoin operation.

14. The computerized system of claim 12, wherein for identifying the first join operation the processor is further configured to:
   building a graph data structure from the query, the graph comprising: a respective node for each table in the query, and an edge connecting two nodes where the database query comprises a join operation between the two tables represented by the two nodes, the edge representing the join operation; and
   traversing the graph for identifying edges representing at least the first join operation.

15. A computer program product comprising a non-transitory computer readable storage medium retaining program instructions, which program instructions when read by a processor, cause the processor to perform a process, the process including:
   upon receiving a database query comprising at least a first join operation and a second join operation:
   storing the database query in the memory;
   identifying by the processor within the database query the first join operation, wherein the first join operation is a many-to-many join operation or a one-to-many join operation between a first table and a second table, wherein fields of the second table are used only for filtering rows from the first table or for joining with another table; and
   converting by the processor the first join operation to an enhanced operation which eliminates returning at least two matches for at least one row from the first table when the database query is executed, wherein the enhanced operation does not cause a join.

16. A database management system for enhancing database query execution, the database management system configured for managing a database, the database management system operatively connected to a storage device, the database management system comprising a processor and a memory, the memory containing instructions that, when executed by the processor, configures the processor to:
   upon receiving a database query comprising at least a first join operation and a second join operation:
   store the database query in the memory;
   identify within the database query the first join operation, wherein the first join operation is a many-to-many join operation or a one-to-many join operation between a first table and a second table, wherein fields of the second table are used only for filtering rows from the first table or for joining with another table; and
   convert the first join operation to an enhanced operation which eliminates returning at least two matches for at least one row from the first table when the database query is executed, wherein the enhanced operation does not cause a join.

* * * * *